United States Patent Office 2,838,568
Patented June 10, 1958

2,838,568

N,N'-BIS(4-CYCLOHEXYLCYCLOHEXYL)ALKYL-IDENEDIAMINES

Harry F. Brust, Midland, Mich., assignor to The Dow Chemical Company, Midland, Mich., a corporation of Delaware No Drawing. Application May 6, 1957
Serial No. 657,046

3 Claims. (Cl. 260—563)

The present invention is concerned with N,N'-bis(4-cyclohexylcyclohexyl)alkylidenediamines having the formula

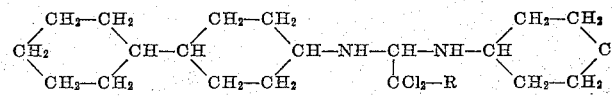

In this and succeeding formulae, R represents hydrogen, chlorine, chloromethyl, chloroethyl, methyl, ethyl or propyl. These compounds are crystalline solids somewhat soluble in many organic solvents and substantially insoluble in water. They have been found to be useful as parasiticides and are adapted to be employed as active toxic constituents in dust and spray compositions for the control of the growth of many bacterial and fungal organisms such as *Alternaria solani*. The compounds are also useful as herbicides for the control of the growth of seeds.

The new compounds may be prepared by causing a polychloroaldehyde having the formula

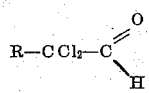

to react portionwise with (bicyclohexyl)-4-amine. The reaction is carried out in the presence of an inert organic solvent such as ethanol, methanol or ether. Good results are obtained when at least two molecular proportions of the amine are employed with each molecular proportion of the polychloroaldehyde. The reaction is somewhat exothermic and takes place smoothly within the temperature range of from about −10° to about 70° C. with the formation of the desired product and water of reaction. The temperature may be controlled by regulating the rate of contacting the reactants and by external cooling.

In carrying out the reaction, the polychloroaldehyde is contacted portionwise with the (bicyclohexyl)-4-amine in the reaction solvent and in the contacting temperature range. During the contacting, the desired product oftentimes precipitates in the reaction mixture as a crystalline solid. Upon completion of the reaction, the reaction mixture may be cooled to precipitate the desired product or to precipitate further product. The precipitate conveniently may be separated in conventional manner such as by filtration or decantation and thereafter purified by recrystallization from suitable organic solvents.

The (bicyclohexyl)-4-amine employed as a starting material in the present invention occurs in two isomeric forms known as the alpha and beta isomers. These two isomers may be prepared by known methods. In such methods, 4-cyclohexylcyclohexanol is dehydrogenated over a copper catalyst at 300° C. to form 4-cyclohexylcyclohexanone, and this product thereafter ammoniated to form a 2-cyclohexylcyclohexanone imine. The latter is thereafter hydrogenated over a nickel catalyst at 60° C. and 75 pounds pressure per square inch to give a reaction mixture containing about equal amounts of the alpha and beta isomers of (bicyclohexyl)-4-amine. The hydrogen chloride salt of the beta isomer of the amine is soluble in chloroform while the hydrogen chloride salt of the alpha isomer of the amine is substantially insoluble in chloroform. Thus, the isomeric amines may be separated in the form of their hydrogen chloride salts, and the salts thereafter converted to the free amine. The hydrogen chloride salts of the alpha and beta isomers of the amine melt at 295°–300° C. and 228°–232° C., respectively, while the alpha isomer of the amine melts at 58°–62° C. and the beta isomer of the amine melts at 32° C.

The following examples illustrate the invention but are not to be construed as limiting:

*Example 1.—2,2,3-trichloro-N,N'-bis-(4-cyclohexylcyclohexyl)-butylidenediamine α-isomer*

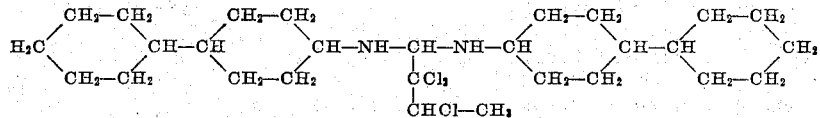

2,2,3-trichlorobutyraldehyde (17.5 grams; 0.1 mole) dissolved in 100 milliliters of ether was slowly added portionwise over a period of about 15 minutes to 36.2 grams (0.2 mole) of (bicyclohexyl)-4-amine α-isomer dissolved in 200 milliliters of ether. The addition was carried out with stirring and cooling and at a temperature of from 20° to 30° C. During the addition, a 2,2,3-trichloro-N,N'-bis(4-cyclohexylcyclohexyl) butylidenediamine α-isomer product precipitated in the reaction mixture as a crystalline solid. The solid product was separated by filtration, and recrystallized from a petroleum hydrocarbon having a boiling range of from 60°–100° C. The recrystallized product melted at 84°–84.5° C. and had a nitrogen content of 5.43 percent as compared to the calculated value of 5.63 percent.

*Example 2.—2,2,3-trichloro-N,N'-bis(4-cyclohexylcyclohexyl)propylidenediamine α-isomer*

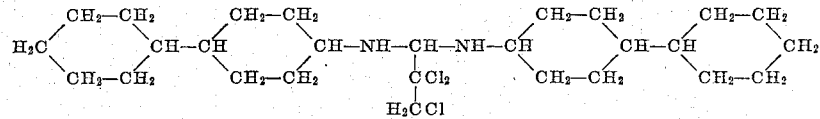

In a manner similar to Example 1, 16.15 grams (0.1 mole) of 2,2,3-trichloropropionaldehyde dissolved in 100 milliliters of ether is added portionwise over a period of 30 minutes to 36.2 grams (0.2 mole) of (bicyclohexyl)-4- amine α-isomer dissolved in 300 milliliters of ether. The addition is carried out with stirring and cooling and at a temperature of from 30 to 35° C. During the addition, a 2,2,3-trichloro-N,N'-bis(4-cyclohexylcyclohexyl)propylidenediamine α-isomer product precipitates in the reaction mixture as a crystalline solid and is separated by filtration and dried. 2,2,3-trichloro-N,N'-bis(4-cyclohexylcyclohexyl)propylidenediamine α-isomer has a molecular weight of 469.5.

*Example 3.—2,2-dichloro-N,N'-bis(4-cyclohexylcyclohexyl)ethylidenediamine α-isomer*

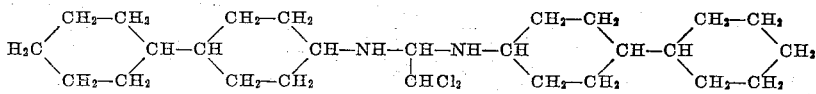

In a manner similar to Example 1, 11.3 grams (0.1 mole) of 2,2-dichloroacetaldehyde dissolved in 150 milliliters of ether was added portionwise over a period of 20 minutes to 36.2 grams (0.2 mole) of (bicyclohexyl)-4-amine α-isomer dissolved in 200 milliliters of ether. The addition was carried out with stirring and cooling and at a temperature of from 30° to 35° C. During the addition, a 2,2-dichloro - N,N'- bis(4 - cyclohexylcyclohexyl)ethylidenediamine α-isomer product precipitated as a crystalline solid and was separated by filtration and dried. This product melted at 92°–94° C.

In a similar manner, the β-isomers of 2,2,2-trichloro-N,N'-bis(4-cyclohexylcyclohexyl)ethylidenediamine; 2,2-dichloro - N,N'- bis(4- cyclohexylcyclohexyl)butylidenediamine; and 2,2-dichloro-N,N'-bis(4-cyclohexylcyclohexyl)pentylidenediamine may be prepared by reacting (bicyclohexyl)-4-amine β-isomer with 2,2,2-trichloroacetaldehyde, 2,2-dichlorobutyraldehyde and 2,2-dichlorovaleraldehyde, respectively.

The compounds of the present invention have been tested and found to be effective as herbicides and parasiticides. For such use, the products may be dispersed on an inert finely divided solid and employed as dusts. Also, such mixtures may be dispersed in water with the aid of a wetting agent, and the resulting aqueous suspensions, employed as sprays. In other procedures, the product may be employed as active toxic constituents of oil-in-water emulsions or water dispersions with or without the addition of wetting dispersing or emulsifying agents. In representative operations, substantially complete controls of tomato early blight (*Alternaria solani*) on tomato plants have been obtained with the application of aqueous compositions containing 0.12 pound of 2,2,3-trichloro-N,N'-bis(4-cyclohexylcyclohexyl)butylidenediamine α-isomer per 100 gallons of ultimate mixture to the foliage of the tomato plants.

I claim:

1. An N,N'-bis(4-cyclohexylcyclohexyl)alkylidenediamine having the formula

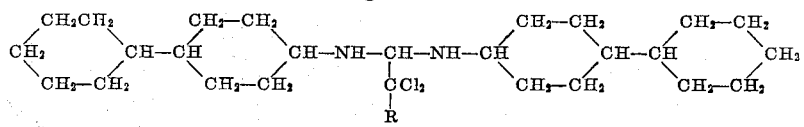

wherein R represents a member selected from the group consisting of hydrogen, chlorine, chloromethyl, chloroethyl, methyl, ethyl and propyl.

2. 2,2,3-trichloro - N,N'- bis(4 - cyclohexylcyclohexyl)-butylidenediamine α-isomer.

3. A process for the preparation of an N,N'-bis(4-cyclohexylcyclohexyl)alkylidenediamine having the formula

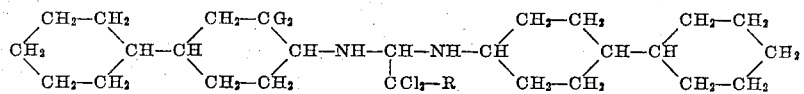

which comprises the step of reacting portionwise at least two molecular proportions of (bicyclohexyl)-4-amine with one molecular proportion of a polychloroaldehyde having the formula

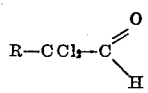

the symbol R in the above formulae representing a member selected from the group consisting of hydrogen, chlorine, chloromethyl, chloroethyl, methyl, ethyl and propyl.

No references cited.